United States Patent [19]

Stueber

[11] Patent Number: 4,760,665
[45] Date of Patent: Aug. 2, 1988

[54] FISHHOOK SHIELDS

[76] Inventor: George P. Stueber, Box 146, Searles, Minn. 56084

[21] Appl. No.: 19,188

[22] Filed: Feb. 25, 1987

[51] Int. Cl.$^4$ ............................................. A01K 83/02
[52] U.S. Cl. ......................................................... 43/36
[58] Field of Search ..................... 43/35, 36, 43.2, 43.4

[56] References Cited

U.S. PATENT DOCUMENTS

| 610,098 | 8/1898 | Sly | 43/36 |
|---|---|---|---|
| 1,172,780 | 2/1916 | Ferree | 43/36 |
| 1,355,858 | 10/1920 | Smith | 43/36 X |
| 2,445,461 | 7/1948 | St. John | 43/35 |
| 2,806,318 | 9/1957 | Roberts | 43/35 |
| 3,952,444 | 4/1976 | Hameen-Antilla | 43/36 X |

FOREIGN PATENT DOCUMENTS 90698 11/1937 Sweden .

Primary Examiner—Nicholas P. Godici
Assistant Examiner—Carmine Cuda
Attorney, Agent, or Firm—Leon Gilden

[57] ABSTRACT

A fishhook shield is designed to cover a hook while a fishing line is being retrieved. A helical spring moves the shield away from the hook when fishing line retrieval ceases. A second embodiment involves a shield shaped like a lure, and a plurality of hooks are retained within the body of the lure. When a fish bites the lure, a trigger mechanism is actuated and the hooks are ejected out of the back of the lure so as to be positioned for hooking the fish.

1 Claim, 4 Drawing Sheets

FISHHOOK SHIELDS

BACKGROUND OF THE INVENTION

1. Field of the Invention

The present invention relates to fishing equipment, and more particularly pertains to new and improved shields which are used to cover fishing hooks to prevent their entanglement with roots, weeds, and other debris.

2. Description of the Prior Art

The use of various types of fishing hook shields is well known in the prior art. A number of these prior art devices utilize trigger mechanisms for releasing one or more fishing hooks from a protective chamber as the result of a fish striking a lure. For example, U.S. Pat. No. 2,729,013, which issued to A. Chandler on Jan. 3, 1956, discloses an artificial fishing bait which includes a hook-equipped projectible and retractable plunger assembly. When a fish strikes the lure, a trigger releases the spring-biased plunger mechanism so as to eject a treble hook outwardly from the back of the lure.

A less complex construction for a trigger actuated fishing hook ejectable from a fishing lure is to be found in U.S. Pat. No. 3,631,624, which issued to E. Edde on Jan. 4, 1972. The Edde lure includes a fishing hook which is ejected from a protective chamber in a body member by the extension of a helical spring normally held under compression by a spring loaded trigger. The trigger is uncocked and the ejection spring effects an ejectment of the hook when a fish bites the lure.

While both of the above-described lures are functional for their intended purposes, it will be observed that each of these lures utilize a single pivotal trigger mechanism positioned along one side of a lure. Inasmuch as a fish may strike a lure from virtually any angle, there is a high degree of probability that in many cases, the trigger mechanism would not be actuated, thus eliminating any possibility of hooking the fish. Further, once the hooks have been ejected from a lure, they will remain in an extended position which could permit the lure to become entangled in roots, weeds, and the like. As such, there appears to be a continuing need for new and improved entanglement-free fishing lures wherein such lures would more reliably effect an ejectment of encased hooks in the event of a fish bite and also wherein such lures would shield the hooks during a retrieval of the fishing line. In this respect, the present invention substantially fulfills this need.

SUMMARY OF THE INVENTION

In view of the foregoing disadvantages inherent in the known types of fishhook shields now present in the prior art, the present invention provides an improved fishhook shield wherein the same can be protectively stored within a fishing lure until a fish bites, while the hooks are also protectively retained within the lure during a retrieval of the associated fishing line. As such, the general purpose of the present invention, which will be described subsequently in greater detail, is to provide new and improved fishing hook shields which have all the advantages of the prior art fishing hook shields and none of the disadvantages.

To attain this, the present invention basically utilizes a shield member which slidably moves over and protects one or more fishing hooks attached to a fishing line. In a first embodiment of the invention, the shield slides down over the hooks during a retrieval of the fishing line, while a compressed spring causes the shield to move away from the hooks during a cessation of fishing line retrieval. In a second embodiment, the hooks are retained within a fishing lure by a compressed spring, and a trigger mechanism which extends completely around the lure is used to release the hooks as the result of a fish bite. If desired, the hooks can be expanded outwardly by springs extending therebetween. In the event that the hook assembly does not engage the fish, the lure will slide downwardly into abutment with or over the fishhooks to prevent entanglement.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved fishing hook shields which have all the advantages of the prior art fishing hook shields and none of the disadvantages.

It is another object of the present invention to provide new and improved fishing hook shields which may be easily and efficiently manufactured and marketed.

It is a further object of the present invention to provide new and improved fishing hook shields which are of a durable and reliable construction.

An even further object of the present invention is to provide new and improved fishing hook shields which are susceptible of a low cost of manufacture with regard to both materials and labor, and which accordingly are then susceptible of low prices of sale to the consuming public, thereby making such fishing hook shields economically available to the buying public.

Still yet another object of the present invention is to provide new and improved fishing hook shields which provide in the apparatuses and methods of the prior art some of the advantages thereof, while simultaneously overcoming some of the disadvantages normally associated therewith.

Still another object of the present invention is to provide new and improved fishing hook shields designed to protect fishing hooks from entanglement with various debris.

Yet another object of the present invention is to provide new and improved fishing hook shields which utilize a more reliable trigger mechanism for releasing hooks from an artificial lure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
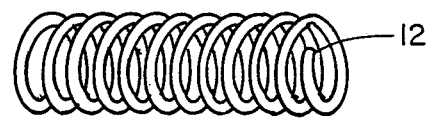
FIG. 1 is a perspective view of a helical spring utilized in a combination of the present invention.
Figure 2:
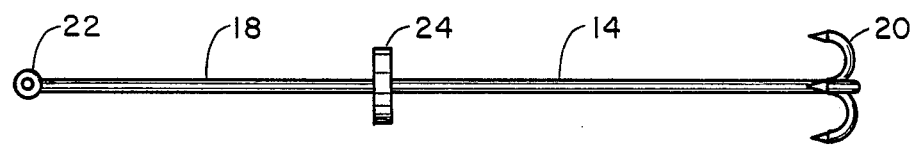
FIG. 2 is a side elevation view of the hook assembly utilized in the combination of the invention.
Figure 3:
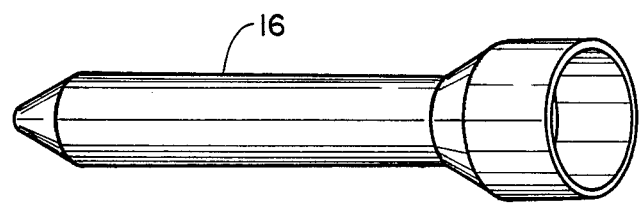
FIG. 3 is a perspective view of the hook protective shield utilized with the invention.

With reference now to the drawings, and in particular to FIGS. 1-6 thereof, a first embodiment of a new and improved fishing hook shield assembly embodying the principles and concepts of the present invention and generally designated by the reference numeral 10 will be described.

More specifically, it will be observed that the fishing hook shield assembly 10 includes the use of a lightweight easily compressible helical spring 12, a barbed fishing hook arrangement 14, and a protective shield member 16. As illustrated, the fishing hook arrangement 14 includes an elongated metallic shank 18 to which one or more conventional barbed fishhooks 20 are integrally attached. The shank 18 further includes an integral eye 22 which facilitates an attachment of the hook arrangement 14 to a conventional fishing line. Perpendicularly disposed along an intermediate portion of the shank 18 is a circular member 24, with this member most likely being of a metallic or plastic construction and being fixedly secured to the fishing hook shank.

Figure 5:
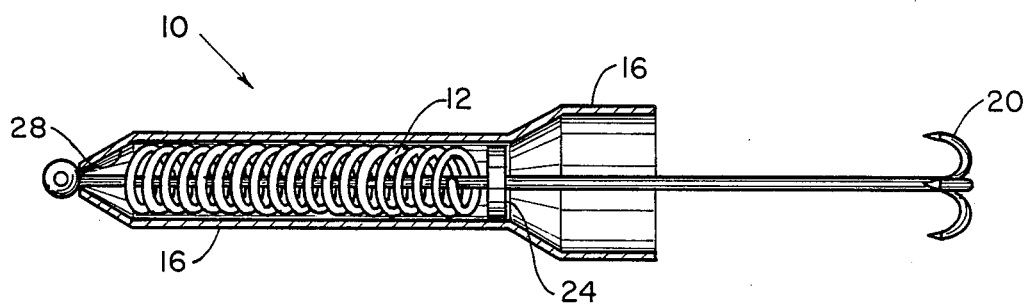
FIG. 5 is a side elevation view, partly in cross section, more particularly illustrating the assembly of the components shown in FIGS. 1-3.

As best illustrated in FIG. 5, the first embodiment 10 of the invention envisions the positioning of the helical spring 12 between the eye 22 and the circular member 24 of the fishing hook arrangement 14, with the shank 18 thereof being directed through the coils of the spring. Slidably disposed over the spring 12 is the lure and shield assembly 16, while the barbed hooks 20 then extend outwardly and rearwardly of the lure 10 so as to be in a fish hooking position.

Figure 6:
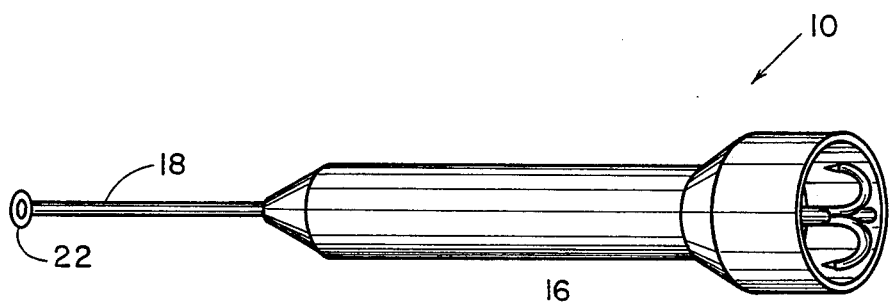
FIG. 6 is a perspective view of the first embodiment of the invention in an operable position.
Figure 4:
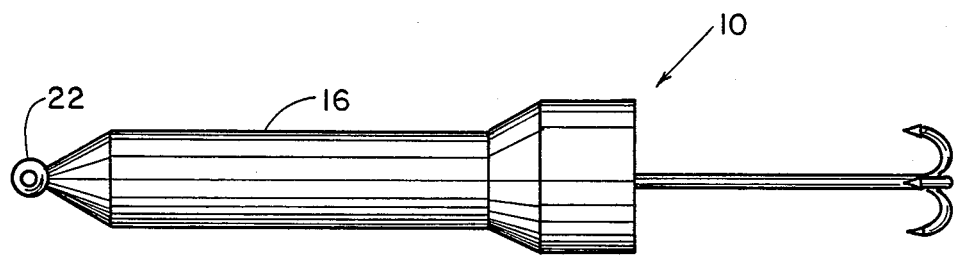
FIG. 4 is a side elevation view of the assembled components shown in FIGS. 1-3, with these assembled components comprising a first embodiment of the invention.

As to the manner of usage and operation of the first embodiment 10 of the invention, it will be observed that the lure, when not being retrieved through the water, will normally appear as shown in FIG. 4. When a fisherman casts the lure 10 into the water and a retrieval thereof is commenced, the pressure of the water will force the shield 16 to slide along the shank 18 of the fishing hook arrangement 14, and as is now apparent, the spring 12 will be compressed between a forward concave interior portion 28 of the shield 16 and the circular member 24. The spring 12 will continue to compress until the shield extends over the barbed hooks 20 as best illustrated in FIG. 6. As such, the hooks 20 are protectively secured within the shield 16 so as to prevent their entanglement with roots, weeds, and the like during a retrieval of the lure 10. However, if a fish strikes the lure 10, the retrieval of the fishing line will temporarily cease and the spring 12 will cause the shield 16 to move forwardly into engagement with the eye 22, thereby to expose the hooks 20 so that the fish can hopefully be captured.

Figure 7:
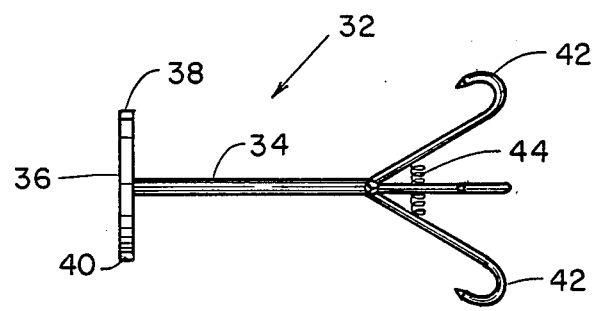
FIG. 7 is a side elevation view of a modified hook assembly utilizable in a second embodiment of the invention.

FIGS. 7-10 of the drawings illustrate a modified embodiment of the fishing lure comprising the present invention with this modified embodiment being generally designated by the reference numeral 30. As illustrated, the fishing lure 30 comprises a fishing hook arrangement 32 that includes an elongated shank 34 with a circular plate 36 being orthogonally aligned with and fixedly secured to the shank as best illustrated in FIG. 7. The circular plate 36 could be integrally or otherwise separably attached to the shank 34 and includes first and second radially extending guide members 38, 40. The guides 38, 40 would most desirably be integrally attached to the circular plate member 36 and essentially comprise two radially extending rectangularly-shaped fingers utilizable for a purpose which will be subsequently described.

A fishing hook arrangement 32 further includes a plurality of barbed hooks 42 which are pivotally attached to an opposed end of the shank 34 by some conventional means. While the hooks 42 could be fixedly secured to the shank 34 in the manner of the fishing hook arrangement 14, this modified embodiment of the invention also envisions the use of a plurality of small helical springs 44 fixedly secured between the hooks so as to effect their radial expansion away from the axis of the shank 34 in a now apparent manner.

Figure 8:
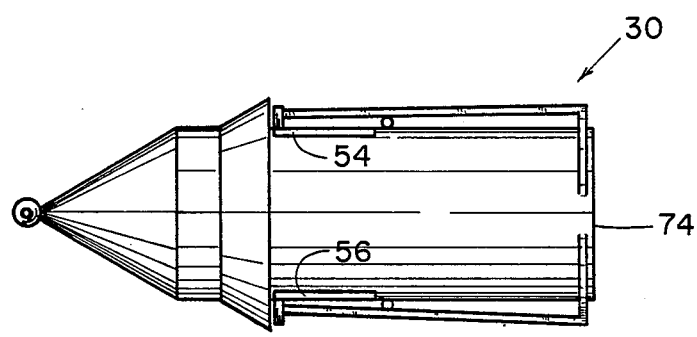
FIG. 8 is a side elevation view of the second embodiment of the invention.
Figure 9:
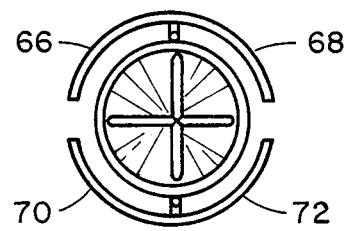
FIG. 9 is a rear elevation view of the second embodiment of the invention.
Figure 10:
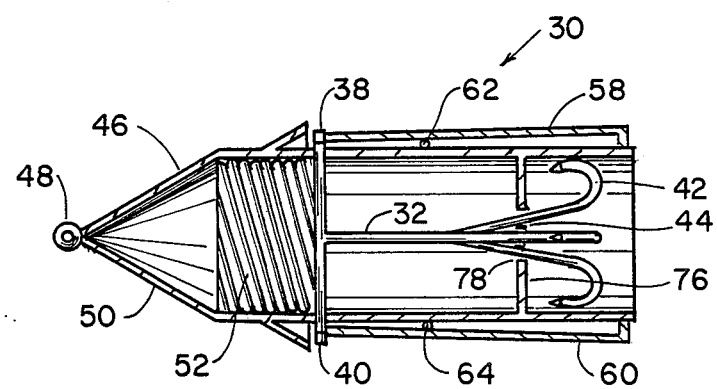
FIG. 10 is a side elevation view, partly in cross section, of the second embodiment of the invention.

FIGS. 8, 9 and 10 illustrate the fishing hook arrangement 32 operably contained within a lure and fishing hook shield 46. The lure 30 includes a forwardly positioned eye 48 operably attached thereto, with this eye comprising the means of attaching the fishing line to the lure in a conventional manner. A forward conical section 50 of the shield 46 contains a compressible helical spring 52, and this spring is compressible between the forward lure portion and the circular plate 36. The shield 46 further includes oppositely disposed elongated slots 54, 56, and the respective outwardly extending fingers 38, 40 associated with the circular plate 36 extend through and are guidingly retained within these slots.

First and second triggers 58, 60 are respectively pivotally attached by conventional means to an exterior circumferential surface of the shield 46. More specifically, the triggers 58, 60 are attached to the shield 46 at respective pivot connection points 62, 64. As best illustrated in FIG. 9, the trigger 58 includes end positioned arms 66, 68 which are curved around a circumferential portion of the shield 46. Similarly, the trigger 60 includes end positioned circular arms 70, 72 which are curved around a further circumferential portion of the shield 46. As such, these arms 66–72 substantially encircle an end portion 74 of the shield 46.

As most clearly illustrated in FIG. 10, an interiorly positioned plate member 76 is perpendicularly aligned along an axial length of the shield 46 and includes a centrally positioned through-extending aperture 78 into which the hooks 42 may be guidingly positioned. The aperture 78 operates to collapse the hooks 42 against the compressible springs 44 so as to allow the fishing hook arrangement 32 to be drawn inwardly into the shield 46 in a protective manner.

As to the manner of usage and operation of the second embodiment 30 of the invention, it can be appreciated that the hook arrangement 32 may be retained within the shield 46 in the manner best illustrated in FIG. 10 when the triggers 58, 60 are pivoted downwardly into abutment with the respective fingers 38, 40. When so positioned, the triggers 58, 60 prevent the slidable movement of the fingers 38, 40 in their respective slots 54, 56, and the spring 52 is thus retained in a compressed position in the forward portion 50 of the shield 46. The hooks 42 are accordingly then maintained within the protective shield 46 during a retrieval of the lure 30.

Figure 11:
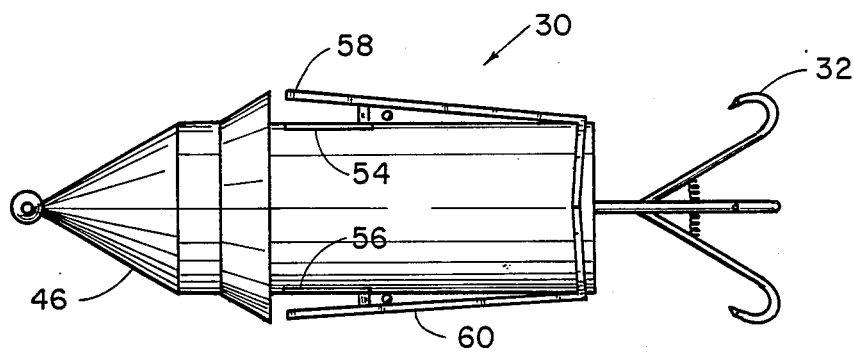
FIG. 11 is a side elevation view of the second embodiment showing the same in the hook released position.

However, when a fish strikes the lure, presumably the fish will come into contact with one or more of the arms 66–72, thus to allow one or more of the triggers 58, 60 to pivot around their respective pivot points 62, 64. A pivotal movement of the triggers 58, 60 will release the fingers 38, 40, and the spring 52 will then cause the fingers to move rearwardly in the lure within the respective slots 54, 56. This of course causes a concurrent movement of the hooks 42 out of the rear portion 74 of the lure 30, and the springs 44 then expand the hooks into a fish capturing position as best illustrated in FIG. 11.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new and improved fishing hook shield assembly comprising;

hook means wherein said hook means includes a circular plate means attached thereto and said circular plate means including at least one finger member extending outwardly through an elongated slot in a shield means slidably positionable over said hook means to prevent said hook means from becoming tangled with various objects and debris during a retrieval of said hook means by fisherman;

spring means for controlling a positioning of said shield means relative to said hook means, said spring means being normally in a compressed position during a retrieval of said hook means, said hook means being effectively retained within said shield means in a protective manner when said spring means is compressed, and trigger means being engageable with said finger member when said spring means is in said compressed position, said trigger means further including arms extending substantially around a complete circumferential portion of said shield means; said trigger means effecting an extensible release of said spring means from said compressed position in response to a strike from a fish, said trigger means being mounted in a pivotal manner on an exterior portion of said shield means and being normally engageable with said hook means when said spring means is in said compressed position.

* * * * *